Jan. 15, 1924.  1,480,828
A. MILLER
DIFFERENTIAL MECHANISM
Filed Jan. 18, 1923
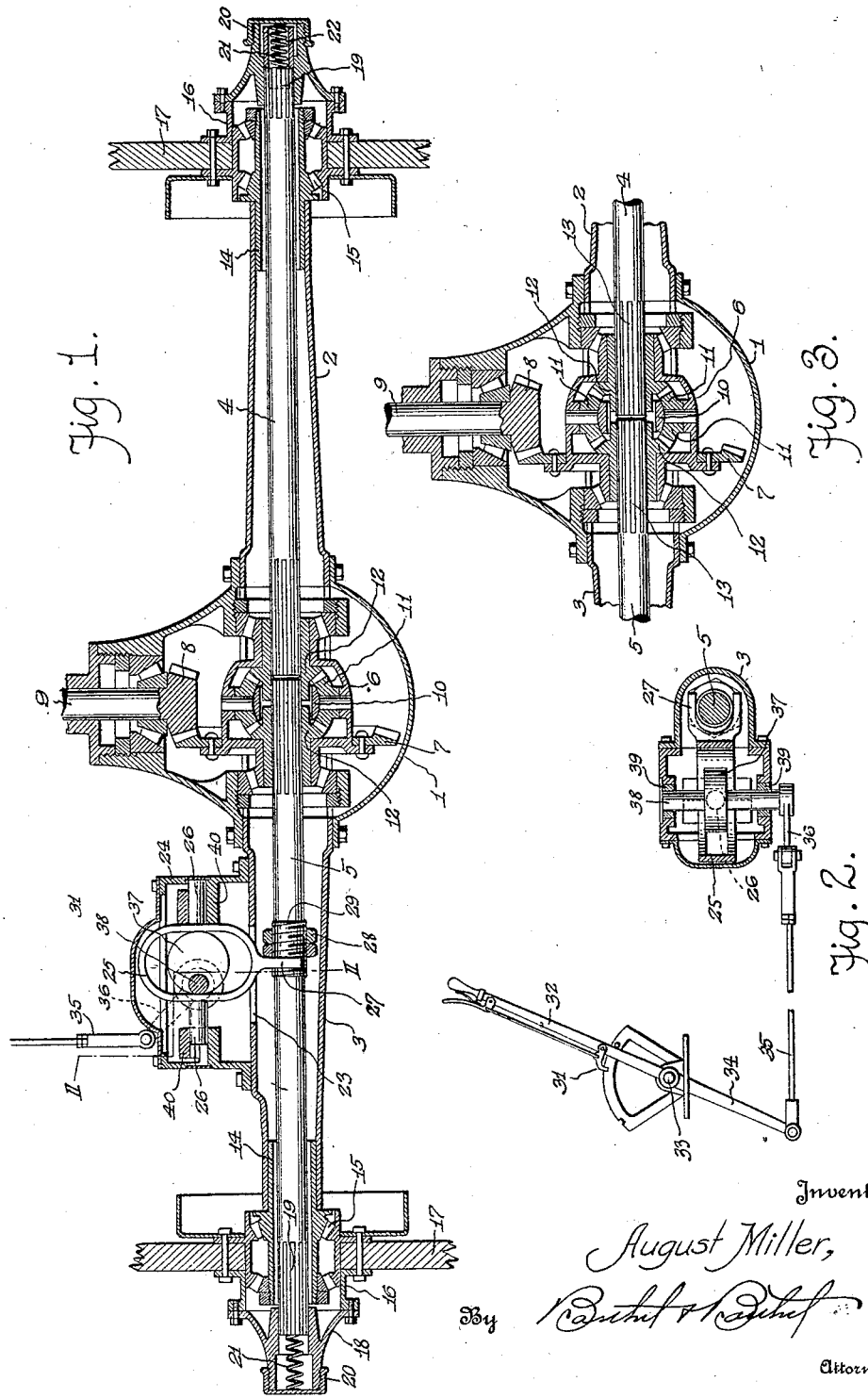
Inventor
August Miller,
By
Attorneys Patented Jan. 15, 1924.

1,480,828

UNITED STATES PATENT OFFICE.

AUGUST MILLER, OF DETROIT, MICHIGAN.

DIFFERENTIAL MECHANISM.

Application filed January 18, 1923. Serial No. 613,391.

*To all whom it may concern:*

Be it known that I, AUGUST MILLER, a citizen of the United States of America, residing at Detroit, in the county of Wayne and State of Michigan, have invented certain new and useful Improvements in Differential Mechanism, of which the following is a specification, reference being had therein to the accompanying drawings.

This invention relates to a differential mechanism for automobiles and other motor driven vehicles, and has special reference to that class of differential mechanism included in the rear axle assemblies of automobiles to permit of the driven wheels of an automobile having an independent action when necessary. It is a well known fact that the usual differential mechanism will permit of one driven wheel rotating at variable speeds relative to the other driven wheel, for instance, when an automobile passes around a corner or as on a curved section of road, and this is accomplished by a constructive arrangement of differential gears that permits of axle shafts being driven in synchronism when an automobile is being driven straight ahead, or one shaft lagging behind the other when the automobile is traveling on a curved section of road.

My invention aims to constructively arrange the rear axle shaft of a rear axle assembly relative to the differential gears and the driven automobile wheels so that said shafts may be bodily shifted to lock the differential gears against a differential action and have rotation as a single gear or one-way drive whereby the axle shafts revolve together at the same rate of speed, even though the driven automobile wheels are rounding a corner or traveling on the curved section of road. By being able to lock or articulate the driven wheels for rotation in synchronism I am able to apply power direct to a wheel that may need such power. For instance, as a wheel enters a rut or encounters a smooth and slippery place prohibiting proper traction, both wheels will receive power alike and one wheel assist the other to overcome the difficulty. A secondary feature of my invention is that of reducing skidding to a minimum and making it optional with the driver of an automobile as to the driving action to take place at the rear axle assembly of the automobile.

The construction entering into my improvement will be hereinafter specifically described and then claimed, and reference will now be had to the drawing wherein—

Figure 1 is a horizontal sectional view of the rear axle assembly in accordance with my invention;

Fig. 2 is a cross sectional view taken on the line II—II of Fig. 1, and

Fig. 3 is a horizontal sectional view of a differential mechanism of the rear axle assembly, showing a condition other than that illustrated in Fig. 1.

In the drawing, the reference numeral 1 denotes a differential housing or casing and connected thereto in the usual and well known manner are rear axle housings 2 and 3 containing "full-floating" rear axle shafts 4 and 5 respectively.

Rotatable in the differential housing 1 is a sectional gear casing 6 provided with a large drive gear 7 meshing with a pinion 8 on a drive shaft 9 extending into the differential housing 1 and suitably supported thereby.

In the gear casing 6 is a differential spider 10 supporting differential pinions 11 meshing with differential gears 12 rotatable in the gear casing 6. Axially of the differential gears 12 are the splined slidable ends 13 of the axle shafts 4 and 5, said shafts being slidable in the differential gears and at all times maintaining a driving relation with said gears.

Mounted in the outer ends of the axle housings 2 and 3 are bearing sleeves 14 for anti-frictional roller bearings 15 supporting the hubs 16 of drive wheels 17. Attached to the outer ends of the hub 16 are hub members 18 into which the outer splined ends 19 of the axle shafts 4 and 5 extend and establish a driving relation between the axle shafts and the drive wheels 17. On the hub members 18 are detachable caps 20 and said hub members provide clearance for coiled expansion springs 21 extending into recesses 22 provided therefor axially of the shafts 4 and 5 and the expansive force of these springs is adapted to centralize the shafts 4 and 5 relative to the differential mechanism so that said shafts will bear the usual relation to the differential gears, as shown in Fig. 3, permitting the differential mechanism to function in the usual and well known manner. When either of the shafts 4 or 5 is shifted the differential mechanism is locked as a unitary device with both shafts operating as one for driving purposes.

A suitable side of the axle housing 3 is provided with an opening 23 and mounted over said opening is a casing 24 containing a reciprocatory shaft engaging member in the form of a cam frame 25 which has opposed pins 26 and a fork 27, said fork normally engaging an abutment 28 on the axle shaft 5. This abutment may be in the form of nuts or collars screwed on an enlarged screwthreaded portion 29 of the axle shaft 5.

In the casing 24 are suitable bearings 40 for the pins 26 and suitable bearings 39 for a cam shaft 38 having a cam 37 thereof engaging in the cam frame 25. One end of the cam shaft 38 has a crank 36 connected by a rod 35 to the crank 34 of a crank shaft 33 located at a point remote from the rear axle housing. On the crank shaft 33 is an operating lever 32 which may be held in an adjusted position by any suitable locking device, generally designated 31. A pedal or any operating device may be used instead of the lever 32, and by transmitting power to the shaft engaging member the fork 27 may bear against the abutment 28 and simultaneously shift the axle shafts 4 and 5 against the expansive force of the spring 21 at the end of the axle shaft 4, thus bodily shifting the shafts 4 and 5 with the splined end 13 of the shaft 5 articulating the differential gears 12, as shown in Fig. 1, thus locking the differential gears and pinions for movement as a whole with the drive gear 7. It is obvious that the axle shafts 4 and 5 may then be driven at the same rate of speed or may freely revolve in synchronism. The differential mechanism is therefore converted into a one-way drive for the rear axle shafts, temporarily rendering the differential mechanism inactive, and permitting of power being simultaneously applied to the drive wheel 17 for traction purpose.

It is thought that the operation and utility of my invention will be apparent without further description, and while in the drawing, there is illustrated a preferred embodiment of my invention, it is to be understood that the structural elements are susceptible to such changes, in size, shape and manner of assembling, as fall within the scope of the appended claims.

What I claim is:—

1. In a vehicle having drive wheels driven through a differential mechanism and shafts, which differential mechanism permits one wheel to revolve at a different rate of speed than the other wheel;—means for causing said wheels to be driven at the same rate of speed, said means including an arrangement of said shafts for bodily movement so that one of said shafts will extend from one differential gear into another and articulate said differential gears for rotation as one, means at the outer ends of said shafts for centralizing said shafts relative to said differential mechanism, and means engaging one of said shafts for bodily shifting said shafts.

2. The arrangement and construction in the claim foregoing, wherein the last mentioned means includes a reciprocatory shaft engaging member and a manually actuated member engaging said reciprocating member.

In testimony whereof I affix my signature in presence of two witnesses.

AUGUST MILLER.

Witnesses:
 AGAPITOS PLATSIS,
 KARL H. BUTLER.